United States Patent

Kubota

[15] 3,688,020

[45] Aug. 29, 1972

[54] COLOR TELEVISION CAMERA INDEXING APPARATUS

[72] Inventor: Yasuharu Kubota, Kanagawa, Japan

[73] Assignee: Sony Corporation, Tokyo, Japan

[22] Filed: Sept. 16, 1970

[21] Appl. No.: 72,593

[30] Foreign Application Priority Data

| | | |
|---|---|---|
| Sept. 18, 1969 | Japan | 44/74175 |
| March 31, 1970 | Japan | 45/27614 |
| March 31, 1970 | Japan | 45/27615 |
| March 31, 1970 | Japan | 45/27616 |

[52] U.S. Cl. ............................................178/5.4 ST

[51] Int. Cl. ............................................H04r 9/06

[58] Field of Search........................178/5.4 R, 5.4 ST

[56] References Cited

UNITED STATES PATENTS 2,843,659 7/1958 James....................178/5.4 ST

*Primary Examiner*—Robert L. Richardson

*Attorney*—Lewis H. Eslinger, Alvin Sinderbrand and Curtis, Morris & Safford

[57] ABSTRACT

A color television camera utilizing a vidicon tube that has a filter in the form of alternate stripes for the primary colors red, green and blue, a pair of electrodes for each set of three stripes and a photoconductive layer, an alternating voltage is applied to the electrodes to provide a predetermined pattern on the surface of the photoconductive layer in the form of an index signal which is overlapped on the photoconductive layer with the image to be reproduced. The composite signal on the photoconductive layer of an index signal and a color video signal is fed through the same terminals that applied the reference alternating voltage to the electrodes to a circuit which separates the color video signal from the index signal. The index signal is then applied to three demodulators to obtain the color video signals.

26 Claims, 30 Drawing Figures

INVENTOR
YASUHARU KUBOTA

INVENTOR
YASUHARU KUBOTA

YASUHARU KUBOTA

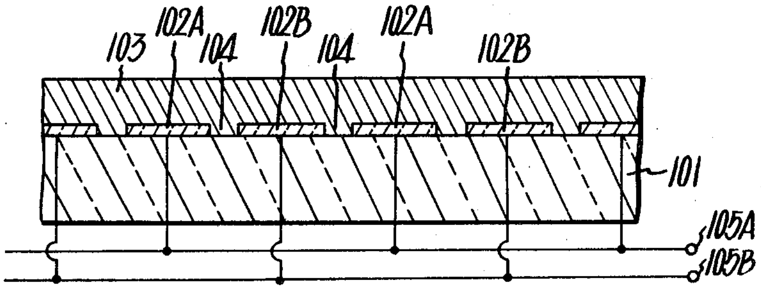
Fig. 6
Fig. 7A
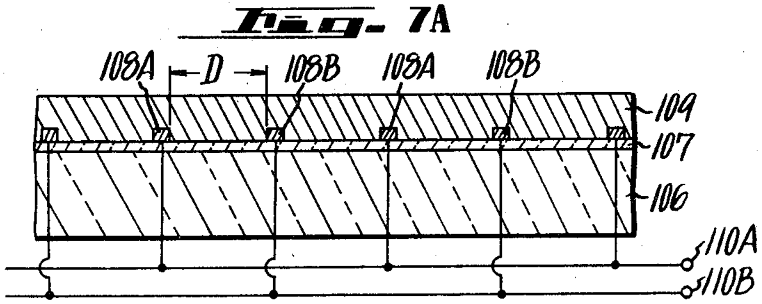
Fig. 7B
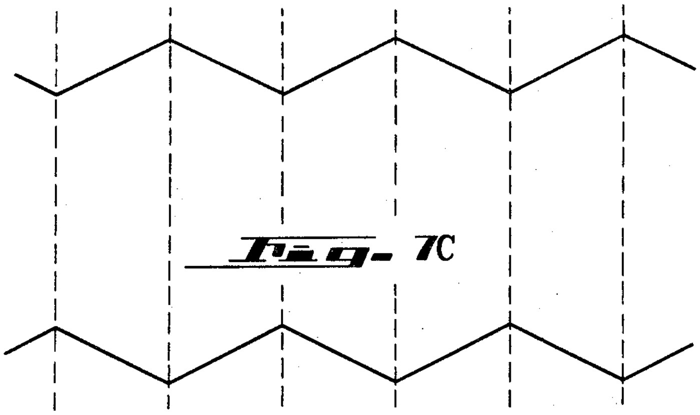
Fig. 7B, Fig. 7C
YASUHARU KUBOTA

INVENTOR
YASUHARU KUBOTA

INVENTOR
YASUHARU KUBOTA

INVENTOR.
YASUHARU KUBOTA

INVENTOR
YASUHARU KUBOTA

COLOR TELEVISION CAMERA INDEXING APPARATUS

BACKGROUND OF THE INVENTION

1. Field of the Invention

This invention relates to a device for reproducing a color video signal by the employment of one image pickup tube, and more particularly to a color video signal reproducing device capable of producing color signals which are free from crosstalk.

2. Description of the Prior Art

A pickup tube of the type having a target with a multiplicity of color filters and signal plates extending transversely of the direction of line scan has been disclosed in U.S. Pat. No. 2,446,249. In this type of pickup tube the signal plates corresponding to the color filters are connected to bus bars and the respective primary color video signals are derived from three signal output terminals connected to the bus bars. However, this pickup tube is defective in that each primary color video signal is mixed with other primary color video signals due to the electrostatic capacity coupling present between the respective signal electrodes. This results in crosstalk which lowers the color purity of the color video signal.

There has also been proposed a system such as disclosed in U.S. Pat. No. 3,502,799 in which a plurality of index signal images and striped color component images are optically formed on the target of a vidicon tube to produce a composite color video signal with an index. With this system, however, the ratio between the color component image area and the effective scanning area of the vidicon is decreased by an amount corresponding to the index signal images. This results in lower resolution. Further, this prior art system necessitates a complicated and expensive device for optically forming the index signal images on the target.

SUMMARY OF THE INVENTION

The present invention employs a pickup tube of the type having a plurality of electrodes, a color filter and a photoconductive surface and adapted to form color separated images on the photoconductive layer. In addition an alternating voltage is supplied to the plurality of electrodes. Accordingly, a predetermined pattern of potential changes is formed on the surface of the photoconductive layer of the pickup tube which is reproduced as an index signal. In this manner the index signal does not narrow the dynamic range of the image pickup tube and the resolution of the color video signal is not lowered.

The index signal, luminance signal and chrominance signal are not derived from each electrode but are picked up in the form of one composite signal, so that even if crosstalk exists between the electrodes, color difference signals can be readily derived from a demodulator circuit, and accordingly a color video signal of good white balance can be obtained.

Since the index signal is obtained at the output of the pickup tube by supplying an alternating voltage to the electrodes in synchronism with the line scanning period of the pickup tube, demodulation of the color video signal is easily accomplished. Further, when the color video signal is reproduced without the chrominance signal the index signal is simply obtained by adding to the output of the image pickup tube a signal produced by delaying the pickup tube output by one horizontal scanning period. In this manner there is no possibility of the index signal being mixed with the demodulated color video signal.

In the device of the present invention the index signal and the chrominance signal are in the same band, and hence the bands of the luminance signal and the chrominance signal can be widened to thereby provide a color video signal with high resolution. In addition, since the index signal and the chrominance signal are derived from a common preamplifier and filter, no difference in the delay time between these signals is produced and accordingly a picture of excellent white balance can be obtained. Further, the index signal does not interfere with the chrominance signal, and hence the picture quality is degraded.

The formation of the color separated images on the photoconductive layer of the pickup tube may be accomplished by any conventional method. For example, a lens screen consisting of many lenticular lenses can be disposed on the surface of the face plate of the pickup tube and the image of a color filter consisting of a plurality of pairs of striped color filter elements and interposed between an object to be televised and the lens screen is projected by the lens screen onto the photoconductive layer and, at the same time, the image of the object being televised is caused by an objective lens to overlap on the image of the color filter. Further, it is also possible that the image of the object to be televised is focused by an objective lens onto the photoconductive layer through a color filter disposed inside of the pickup tube in close proximity to the photoconductive layer. In this case, the optical system is simple in construction and need not be adjusted, so that an inexpensive color television camera can be produced.

In the pickup tube employed in this invention its relative position to the color filter need not be adjusted with high accuracy, and hence adjustment of the pickup tube is easily accomplished.

BRIEF DESCRIPTION OF THE DRAWINGS

FIG. 6 is an enlarged cross-sectional view showing the principal parts of a modified form of the pickup tube of the present invention;

FIG. 7A is an enlarged cross-sectional view showing the principal parts of another modification of the pickup tube;

FIG. 7B and 7C are schematic diagram, for explaining the operation of the pickup tube depicted in FIG. 7A;

DESCRIPTION OF THE PREFERRED EMBODIMENTS

Figure 1:
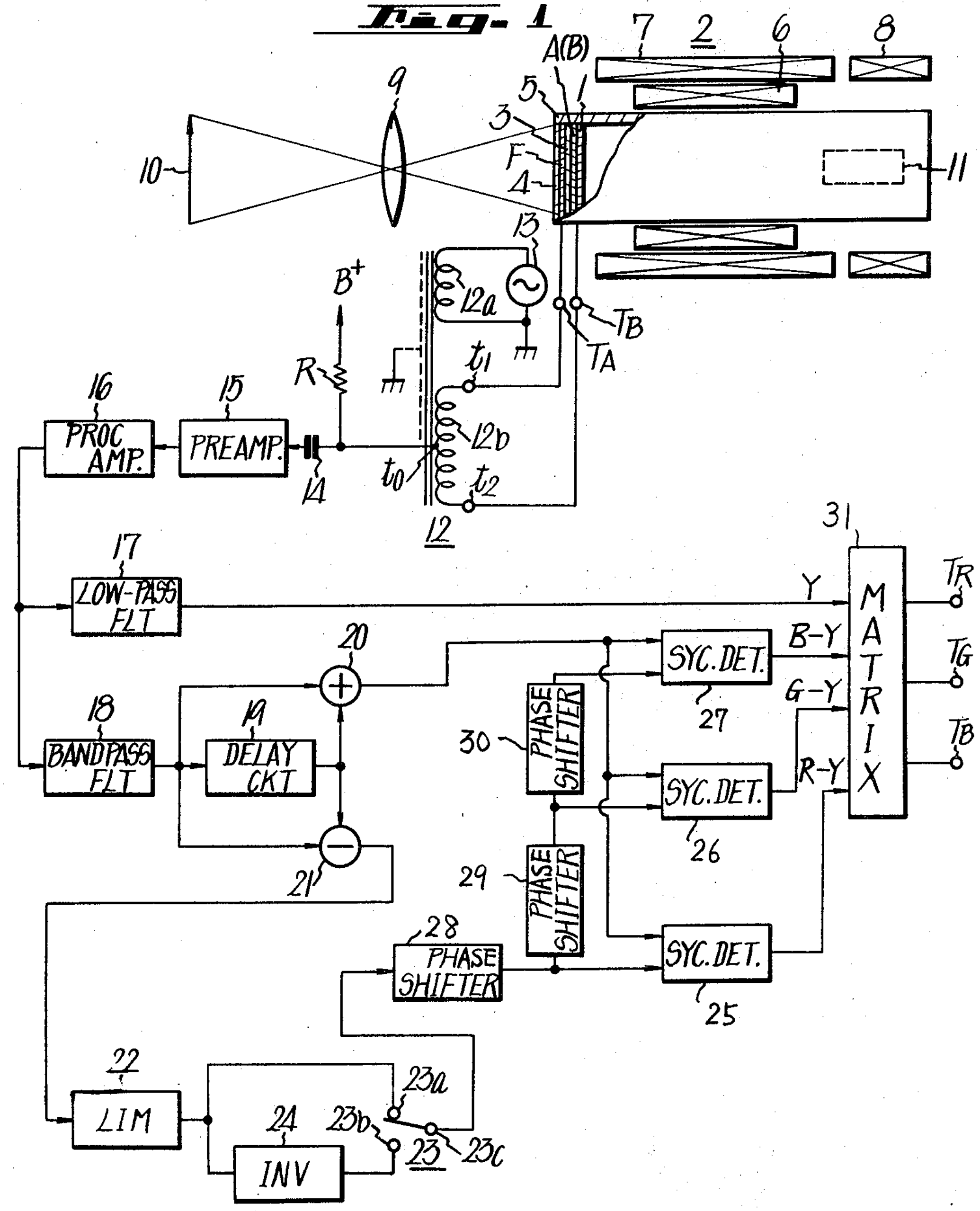
FIG. 1 is a system diagram illustrating one example of a color television camera in accordance with the present invention.
Figure 2:
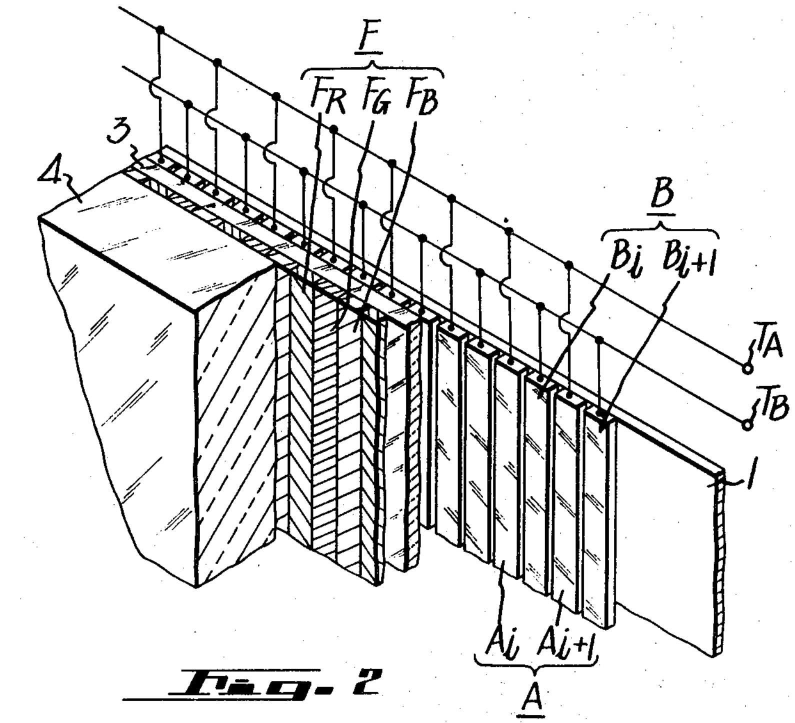
FIG. 2 is a perspective view partly in cross-section and showing the principal parts of the pickup tube employed in the color television camera illustrated in FIG. 1.

FIG. 1 illustrates the fundamental concepts of this invention. In FIG. 1 and 2 two sets of electrodes A ($A_1$, $A_2$, . . . $A_1$, . . . $A_n$) and B ($B_{B1}$, $B_2$, . . .$B_i$,...$B_n$) are disposed adjacent the photoconductive layer 1 of a pickup tube 2. The photoconductive layer 1 is formed for example, of materials such as antimony trisulfide, lead oxide etc. The electrodes A and B are transparent conductive layers formed of tin oxide including antimony and they are alternately arranged in an order which may for example be $A_1$, $B_1$,$A_2$, $B_2$,....$A_i$,$B_i$ ,....$A_n$,$B_n$, the electrodes being respectively connected to terminals $T_A$ and $T_B$ for connection with external circuits. In this case, the electrodes are disposed so that their longitudinal directions may cross the horizontal scanning direction of an electron beam.

The electrodes A and B are disposed on one side of a glass plate 3, on the other side of which an optical filter F made up of red, green and blue color filter elements $F_R$, $f_G$ and $F_B$ arranged in a repeating cyclic order of $F_R$, $F_G$, $F_B$, $F_R$, $F_G$. $F_B$,.... are disposed parallel to the length of the electrodes A and B in such a manner that each triad of red, green and blue color filter elements $F_R$, $F_G$ and $F_B$ may be opposite to each pair of adjacent electrodes $A_i$ and $B_i$. So long as the electrodes A and B and the optical filter F are aligned with each other in their longitudinal directions, their relative arrangement is optional. The optical filter F is fixed to the faceplate 4.

The pickup tube 2 has enclosed therein the photoconductive layer 1, the electrodes A and B, the glass plate 3, the optical filter F and the faceplate 4 mounted on one end of the tube envelope 5. About the image pickup tube 2 there are mounted a deflection coil 6, a focusing coil 7 and an alignment coil 8. Reference numeral 9 indicates an image lens, by means of which the image of an object 10 to be televised is focused onto the photoconductive layer 1 through the faceplate 4. Reference numeral 11 designates an electron gun for emitting an electron beam.

A transformer 12 consists of a primary winding 12*a* and a secondary winding 12*b* having a mid tap $t_0$ and both terminals $t_1$ and $t_2$ of the secondary winding 12*b* are respectively connected to the terminals $T_A$ and $T_B$ of the image pickup tube 2. The primary winding 12*a* is connected to a signal source 13 which produces an alternating signal $S_1$ that is synchronized with the line scanning period of the image pickup tube 2. This alternating signal $S_1$ has a rectangular waveform such as that illustrated in FIG. 3 with a pulse width equal to a horizontal scanning period H of the electron beam, namely a pulse width of, for example, 63.5 microseconds and a frequency which is ½ of the horizontal scanning frequency, namely 15.75/2 KHz. The mid point to of the secondary winding 12*b* of the transformer 12 is connected to the input of a pre-amplifier 15 through a capacitor 14 and is supplied with a DC bias voltage of 10 to 50V from a power source B+ through a resistor R.

Figure 5:
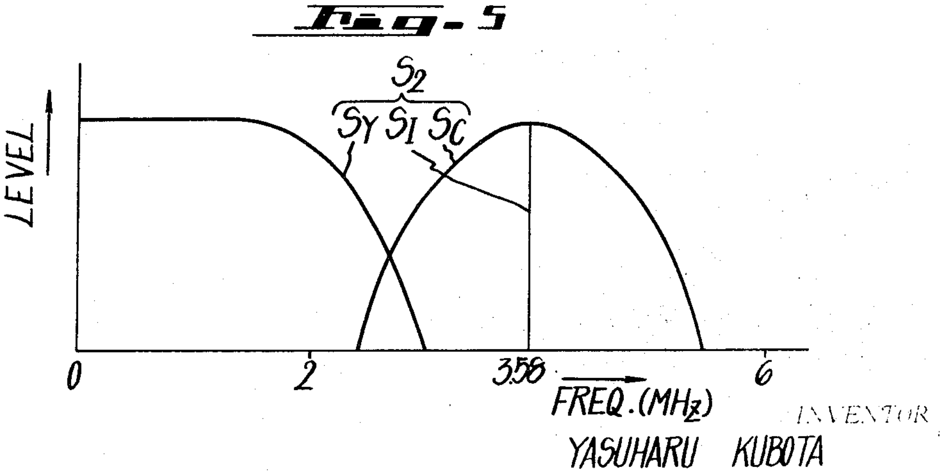
FIG. 5 is a graph showing one example of a frequency spectrum for a color video signal produced by the color television camera of this invention.
Figure 4A:
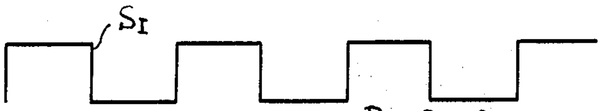

With such an arrangement, the electrodes A and B are alternately supplied with voltages higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, a signal corresponding to the rectangular waveform illustrated in FIG. 4A is derived due to electron beam scanning at the midpoint $t_0$ of the secondary winding 12*b* in a scanning period Hi. When a DC bias voltage of, for example, 30V is supplied to the mid point $t_0$ of the secondary winding 12*b* and an alternating voltage of 0.5V is impressed between the terminals $T_A$ and $T_B$, a current flowing across the resistor R varies by 0.05 microamperes, which can be used as an index signal. The frequency of this index signal $S_I$ is optionally determined with reference to the width and interval of the electrodes A and B and one horizontal scanning period of the electron beam, and can for example be 3.58MHz. When the image of the object 10 is focused on the photoconductive layer 1, signals corresponding to the light intensity of the filtered red, green and blue components are produced on the photoconductive layer 1 in overlapping relation with the index signal $S_I$ to produce a composite signal $S_2$ such as illustrated shown in FIG. 4B, in which the reference characters R, G and B respectively designate portions of the composite signal $S_2$ corresponding to the red, green and blue color components. The composite signal $S_2$ is the sum of the luminance signal $S_Y$, the chrominance signal $S_C$ and the index signal $S_I$, namely $S_2=S_Y+S_C+S_I$. The frequency spectrum of the composite signal $S_2$, as illustrated in FIG. 5, is determined by the width of the electrodes A and B, the width of the optical filter F and the horizontal scanning period. That is, the composite signal $S_2$ in its entirety is in a bandwidth of 6MHz and the luminance and chrominance signals $S_Y$ and $S_C$ are respectively arranged in the lower and higher bands. It is preferred to minimize overlapping of the luminance and chrominance signals $S_Y$ and $S_C$ and, if desired, it is possible to dispose a lenticular lens or the like in front of the image pickup tube 2. This optically lowers resolution and narrows the luminance signal band.

Figure 4B:
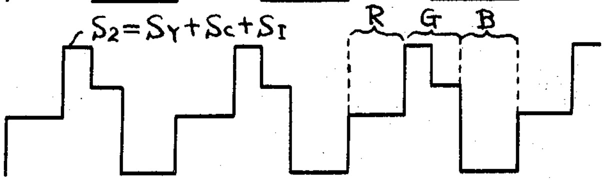

In the next horizontal scanning period $H_{i+1}$ the voltage (the alternating signal) applied to the electrodes A and B is reversed in phase, in which case an index signal-$S_I$ is produced such as depicted in FIG. 4A' which is opposite in phase to the index signal $S_I$ shown in FIG. 4A. Accordingly, a composite signal $S_2'$ is derived at the input side of the pre-amplifier 15 as shown in FIG. 4B', namely $S_2'=S_Y+S_C-S_I$.

Figure 4C:
Figure 4A:
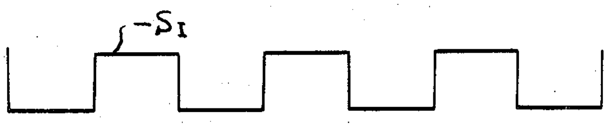
Figure 4B:
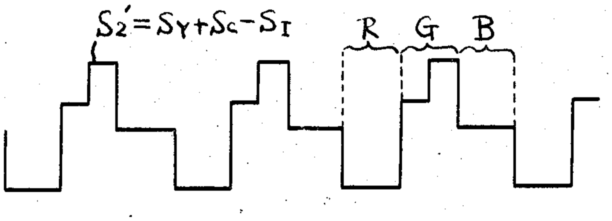
Figure 4C:
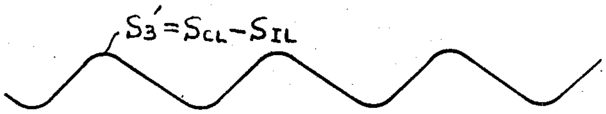

Such a composite signal $S_2$ (or $S_2'$) is first supplied to the pre-amplifier 15 to be amplifier and is then supplied to the process amplifier 16 for waveform shaping and/or gamma correction. Thereafter the signal is applied to a low-pass filter 17 and a bandpass filter 18 respectively. As a result the luminance signal $S_Y$ and a signal $S_3=S_{CL}+S_{IL}$ such as shown in FIG. 4C (or a signal $S_3'=S_{CL}-S_{IL}$such as depicted in FIG. 4C') are respectively derived from the low-pass filter 17 and the bandpass filter 18 separately from each other $S_{Cl}$ and $S_{IL}$ are low frequency components or fundamental components of the chrominance signal $S_L$ and the index signal $S_I$ respectively.

The separation of the index signal $S_I$ and the chrominance signal $S_C$ will hereinbelow be described. Since the repetitive frequencies of the index signals $S_I$ and the chrominance signal $S_C$ are equal to each other, the separation of these signals is achieved in the following manner without using a filter.

Figure 4D:
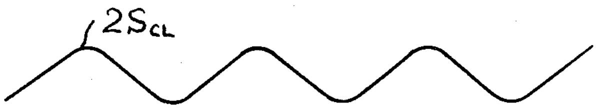

Reference numeral 19 indicates a delay circuit such, for example, as an ultrasonic delay line, by means of which the signal $S_3=S_{CL}+S_{IL}$ (or $S_3'=S_{CL}-S_{IL}$) derived from the bandpass filter 18 is delayed by one horizontal scanning period 1H. Reference numeral 20 designates an adder circuit and 21 a subtraction circuit. The signals $S_3=S_{CL}+S_{IL}$ (or $S_3'=S_{CL}-S_{IL}$) in a certain horizontal scanning period $H_i$ and the signal $S_3'=S_{CL}-S_{IL}$ (or $S_3=S_{CL}+S_{IL}$) in the subsequent horizontal scanning period $H_i+_1$, which are derived from the delay circuit 19 and the bandpass filter 18 are supplied to the adder circuit 20 to be added together, providing as an output a chrominance signal $2S_{CL}$ such as depicted in FIG. 4D. In this case, the content of chrominance signals in adjacent horizontal scanning periods are so similar that they can be regarded as substantially the same. Further, it is also possible to delay the signal from the bandpass filter 18 by three or five horizontal scanning periods due to their similarity.

Figure 4E:
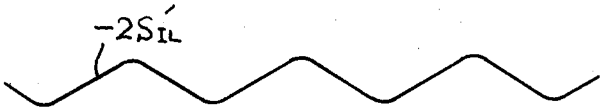
Figure 4F:
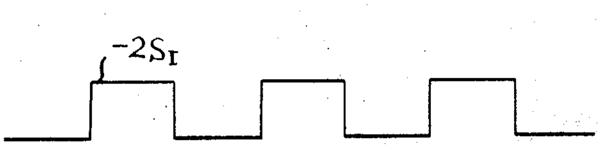

These signals $S_3=S_{CL}+S_{IL}$ (or $S_3'=S_{CL}-S_{IL}$) and $S_3'=S_{CL}-S_{IL}$ (or $S_3=S_{CL}\pm S_{IL}$) in the horizontal scanning periods $H_i$ and $H_i+_1$ are applied to the subtraction circuit 21 to achieve a subtraction $(S_{CL}-S_{IL})-(S_{CL}+S_{IL})$ $\{$or $(S_{CL}+S_{IL})-(S_{CL}-_{SIL})\}$ to derive therefrom an index signal $-2S'_{IL}$ (or $2S'_{IL}$, though not shown) such as depicted in FIG. 4E. The resulting index signal $-S'_{IL}$ (or $2S'_{IL}$) is fed to a limiter circuit 22 to render its amplitude uniform forming an index signal $-2S_I$ (or $2S_I$) as dipicted in FIG. 4F.

The index signal $-2S_I$ (or $2S_I$) thus obtained is reversed in phase at every horizontal scanning period, so that the signal $-2S_I$ is corrected in phase in the following manner. Reference numeral 23 designates a change-over switch (an electronic switch in practice), 23a and 23b its fixed contacts and 23C its movable contact. The output side of the limiter 22 is directly connected to one fixed contact 23a of the change-over switch 23 and to the other fixed contact 23b through an inverter 24. The change-over switch 23 is constructed such that the movable contact 23c makes contact with the fixed contacts 23a and 23b alternately for every horizontal scanning period in synchronism with the alternating signal $S_I$ impressed on the primary winding 12a of the transformer 12 to thereby derive the index signal $2S_I$ from the movable contact 23c at all times.

The chrominance signal $S_{CL}$ derived from the adder circuit 20 is supplied to synchronous detectors 25, 26 and 27, respectively. The index signal $S_{IL}$ is supplied to the synchronous detector 25 through a phase shifter 28 which adjusts the phase of the index signal to the axis of the red signal in order to produce a color difference signal R-Y at the output of the detector 25. In a similar manner the output signal from the phase shifter 28 is supplied the synchronous detector 26 through a phase shifter 29 to produce a color difference signal G-Y at the output of the detector 26 and the output signal from the phase shifter 29 is supplied to the synchronous detector 27 through the phase shifter 30 to produce a color difference signal B-Y at the output of the detector 27. The phase shifters 29 and 30 change the phase of the input signals by 120° respectively. These color difference signals and the luminance signal $S_Y$ are applied to a matrix circuit 31 to derive color signals $S_R$, $S_G$ and $S_B$ at its terminals $T_R$, $T_G$ and $T_B$ respectively. The color signals thus obtained may be suitably processed to produce color television signals for the NTSC system and other various systems.

In the foregoing example the color filter F was placed within the image pickup tube 2 for the formation of the color separated images on the photoconductive layer 1 but it is also possible to adopt a construction such as illustrated in FIG. 6 in which two sets of electrodes 102A and 102B are directly formed on the glass faceplate 101 and are connected to terminals 105A and 105B. A photoconductive layer 103 is deposited on the electrodes 102A and 102B and on the faceplate 101. In this case the color separated images on the photoconductive layer 103 are formed by a color filter disposed outside of the image pickup tube or by a color filter and a lens screen having many lenticular lenses.

The electrodes 102A and 102B are arranged at predetermined intervals. In the event that the electrodes 102A and 102B are made from transparent conductive coatings such as tin oxide, they are about 30 microns wide and spaced about 5 microns apart from each other. The electrodes 102A and 102B are approximately 0.2 microns thick and the photoconductive layer 103 is about 1 micron thick. With such an arrangement, when the photoconductive layer 103 is irradiated by light from the object being televised, almost all of the photocarriers that are produced between adjacent electrodes 102A and 102B, namely on the areas 104 where the electrodes 102A and 102B do not lie, are directed to the faceplate 101. As a result of this, the photoelectric conversion efficiency of the colored light incident on the areas 104 is lowered, thereby decreasing the signal components corresponding to the colored light incident on the areas 104. This introduces defects such as lowering of the color fidelity of the color video signal, loss of white balance, deterioration of the S/N ratio, etc. THe foregoing disadvantage can be overcome by the use of electrodes such as exemplified in FIGS. 7 to 10.

In FIG. 7A a transparent resistance layer 107 is deposited all over a transparent insulating plate 106 and narrow, strip-like electrodes 108A and 108B are formed on the resistance layer 107. The use of narrow electrodes enlarges the distance D between the adjacent electrodes 108A and 108B. A photoconductive layer 109 is formed on the electrodes 108A and 108B and the resistance layer 107. With such an arrangement, photocarriers produced between the electrodes 108A and 108B are directed to the electrodes 108A and/or 108B through the resistance layer 107, so that light from the object to be televised can be efficiently utilized. In this case the transparent resistance layer 107 is a high resistance layer such as tin oxide or the like having a sheet resistance of about $10^5$ to $10^7$ ohm/cm$^2$. In the case of adding antimony as an impurity to tin oxide, the resistance value of the resistance layer can be greatly varied with the amount of antimony, so that a high resistance layer can be obtained with ease. The resistance layer 107 is, for example, about 0.5 microns in thickness.

Where the widths of the electrodes 108A and 108B are substantially negligible, the electrodes 108A and 108B need not be light-transparent but may be formed of a metal such, for example, as copper, aluminum, silver or the like.

With the arrangement illustrated in FIG. 7A, when the alternating signal $S_I$ which is synchronized with the horizontal scanning period is supplied between the electrodes 108A and 108B through the terminals 110A and 110B, a current flows in the resistance layer 107 between the electrodes 108A and 108B to provide in the resistance layer 107 a potential distribution such that the potential gradually increases in the areas adjoining the electrodes 108A or 108B. Accordingly, in some horizontal scanning period the alternating signal $S_I$ is supplied to the electrodes 108A and 108B in such a manner that the electrode 108A is of high potential and provides on the photoconductive layer 109 a potential pattern such as depicted in FIG. 7B when no light is incident on the photoconductive layer 109, while in the subsequent horizontal scanning period the electrode 108B is of high potential and forms a potential pattern such as shown in FIG. 7C. As a result of this, the index signals $S_I$ and $-S_I$ obtained in the respective horizontal periods take the form of triangular signals and not the rectangular signals illustrated in FIG. 4A and 4A'. It will be seen that even when the index signals are triangular signals, the desired operation can be similarly achieved.

It is to be noted that whenever PbO (lead oxide) is used as the photoconductive layer it is necessary to provide a bias light source to project a weak light onto the photoconductive surface. This is required in order to generate an index signal in the dark room since the photoconductive layer does not have a dark current.

Figure 8:
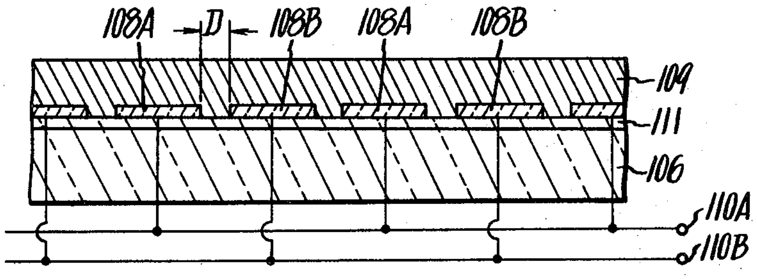
FIG. 8 to 12 are enlarged cross-sectional views showing the principal parts of other modified forms of the pickup tube.

The embodiment illustrated in FIG. 8 is identical in construction with that of FIG. 7 except that the transparent electrodes 108A and 108B B are formed relatively wide. Since the distance D between adjacent electrodes 108A and 108B is narrow in this case, there is deposited on the faceplate 106 a semi-insulating layer 111 such titanium oxide which is lower in resistance value than the dark resistance (the resistance in the absence of light) of the photoconductive layer 109 is but higher than the aforementioned high resistance layer and which has a sheet resistance of, for example, about $10^{10}$ ohms/cm$^2$. THe electrodes 108A and 108B are formed on the semi-insulating layer 111. Since the electrodes 108A and 108B are wide, substantially rectangular signals similar to the index signals illustrated in FIGS. 4A and 4A' are obtained.

Figure 9:
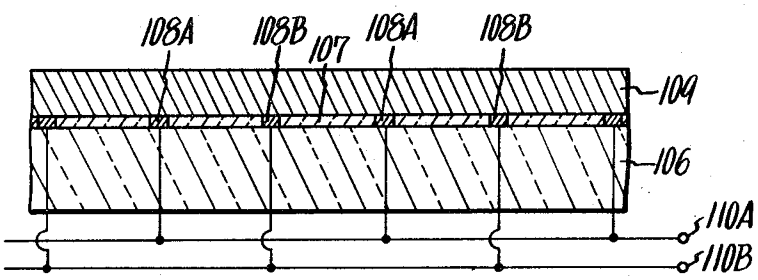

In the example of FIG. 9 narrow, strip-like electrodes 108A and 108B similar to those employed in the example of FIG. 7A are directly deposited on the faceplate 106, and a resistance layer 107 is deposited on the faceplate 106 between the electrodes 108A and 108B in a manner to be flush therewith.

Figure 10:
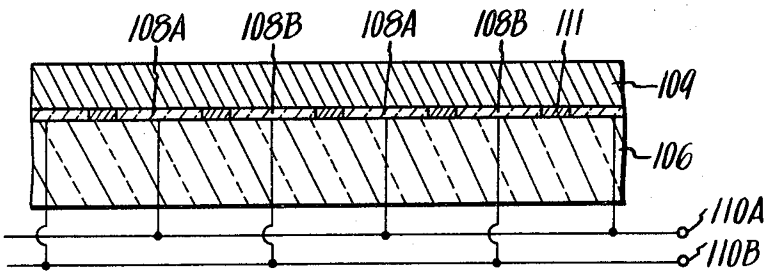

In FIG. 10 transparent electrodes 108A and 108B are formed wide, as in the example of FIG. 8, and a semi-insulating layer 111 is formed between the electrodes 108A and 108B in a manner to be flush therewith as in the example of FIG. 9.

Figure 11:
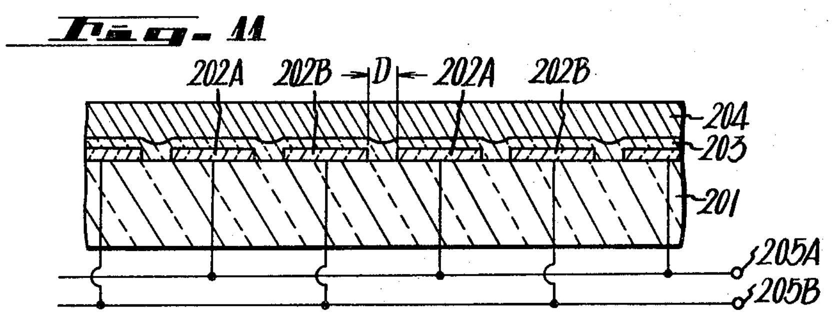
Figure 12:
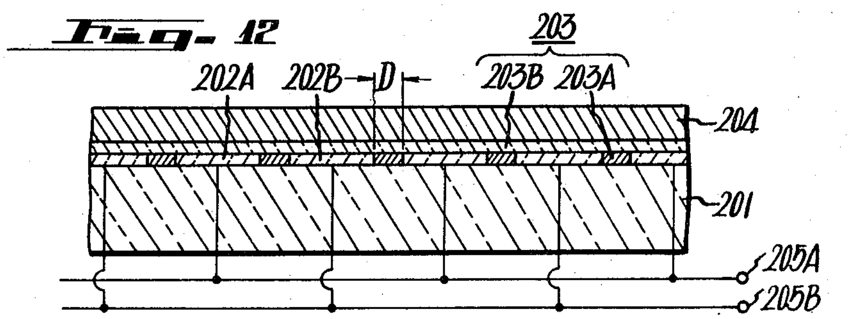

FIGS. 11 and 12, illustrate other improved examples in which the same results as those obtainable in the examples of FIGS. 7 to 10 can be obtained.

In FIG. 11 low resistance transparent electrodes 202A and 202B made of material such as tin oxide are formed relatively wide on a faceplate 201 and a transparent semi-insulating layer 203 is deposited on the electrodes 202A and 202B and on the faceplate 201 therebetween and a photoconductive layer 204 is deposited all over the semi-insulating layer 203. The semi-insulating layer 203 is formed of, for example, titanium oxide or the like which is lower in resistance value than the dark resistance of the photoconductive layer 204 but which has a sheet resistance of, for example, about $10^{10}$ ohms/cm$^2$ as in the example of FIG. 8. The thickness of the semi-insulating layer 203 is, for example, approximately 0.5 microns.

With such an arrangement, photocarriers produced in the photoconductive layer 204 by light irradiated from the object to be televised reach the electrodes 202A or 202B through the semi-insulating layer 203 and photocarriers generated between adjacent electrodes 202A and 202B also reach them through the semi-insulating layer 203. This avoids reduction of the photoelectric conversion efficiency of colored light incident on those areas of the photoconductive layer where the electrodes 202A and 202B do not lie. Accordingly signal components corresponding to the colored light on those areas are obtained in the same manner as the signal components in the areas where the electrodes 202A and 202B lie and the signal components are derived from the terminals 205A and 205B.

In FIG. 12 a first transparent semi-insulating layer 203A is deposited between the electrodes 202A and 202B and a second transparent semi-insulating layer 203B is deposited all over the electrodes 202A and 202B and the first semi-insulating layer 203A, the first and second semi-insulating layers 203A and 203B constituting a semi-insulating layer 203.

Figure 13:
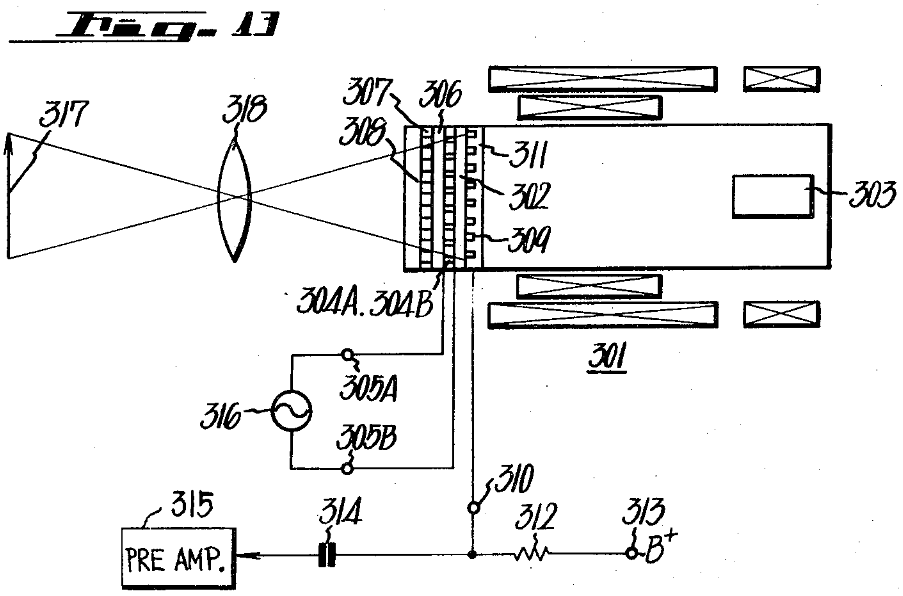
FIG. 13 is a system diagram showing one part of another modification of the color television camera of the present invention.
Figure 14A:
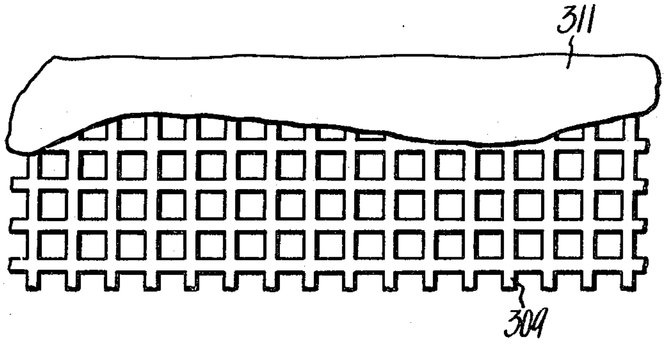
FIG. 14A is an enlarged plan view, partly cut away, illustrating parts of the pickup tube used in the example illustrated in FIG. 13.
Figure 14B:
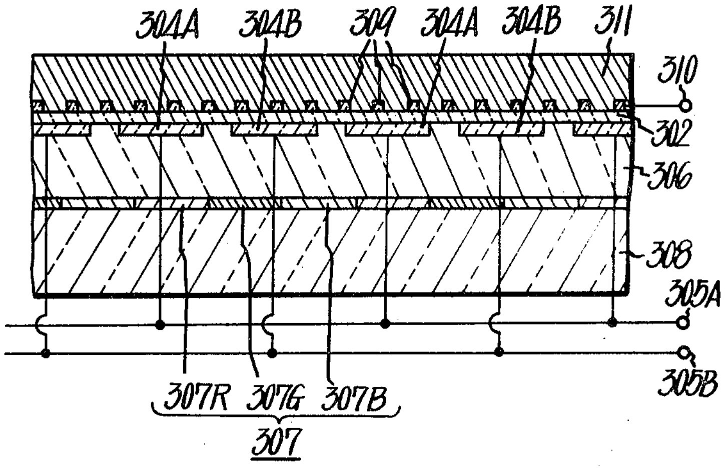
FIG. 14B is a cross-sectional view of a portion of the pickup tube depicted in FIG. 14A.

Although the foregoing examples have been described in connection with using an image pickup tube provided with two sets of electrodes, it is possible to provide one electrode for deriving a video signal including an index signal. FIGS. 13 and 14 illustrate examples employing such an electrode. Reference numeral 301 indicates generally an image pickup tube and 302 a thin transparent insulating layer such as glass. A plurality of sets of electrodes, in the illustrated examples, two sets of electrodes 304A and 304B are deposited on the insulating layer 302 on the opposite side from an electron gun 303. Namely, narrow, strip-like transparent electrodes of predetermined width are sequentially arranged at predetermined intervals across the electron beam scanning direction, namely in a direction crossing the electron beam scanning direction at right angles in the illustrated example. Alternate electrodes 304A are connected together to a common terminal 305A to provide one set of electrodes and the other alternate electrodes 304B are similarly connected to a common terminal 305B to provide the other set of electrodes. On these electrodes 304A and 304B there is disposed a transparent insulating plate 306 such as glass, on which a color filter 307 is placed. The color filter 307 consists of a color filter strip element 307R permitting the passage therethrough of red colored light, a color filter strip element 307G permitting the passage therethrough of green colored light, and a color strip filter element 307B permitting the passage therethrough of blue colored light, the color filter elements 307R, 307G and 307B being of the same width and sequentially arranged in a repeating cyclic order in the direction of array of the electrodes 304A and 304B while extending parallel to the length of the electrodes 304A and 304B. The color filter 307 is disposed in such a manner that each triad of the color filter elements 307R, 307G and 307B corresponds to two adjacent electrodes 304A and 304B. A faceplate 308 is disposed over the filter 307.

A transparent signal electrode 309 of network structure is formed on the thin insulating layer 302 on the side of the electron gun 303. The signal electrode 309 is formed of, for example, nesa as is the case with the signal electrode of the usual image pickup tube but is of network structure. This electrode 309 is connected to an output terminal 310. A photoconductive layer 311 is formed all over the signal electrode 309 and each segment thereof.

The output terminal 310 is connected to a power source terminal 313 through a resistor 312 and to a pre-amplifier 315 through a capacitor 314.

Figure 3:
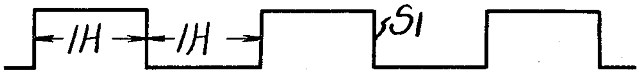
FIG. 3, FIGS. 4A through 4F, and FIGS. 4A′ through 4C′ are waveform diagrams, for explaining the invention.
Figures 14C, 14D:
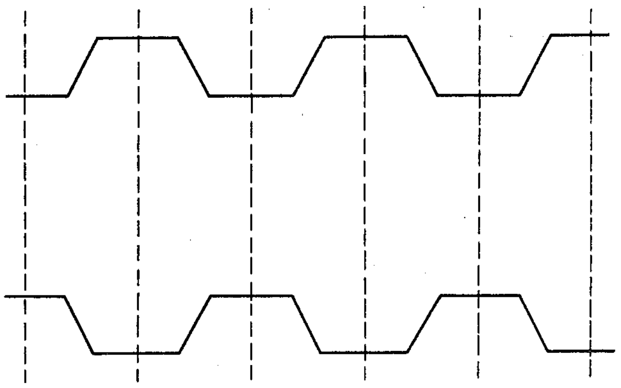
FIG. 14C and 14D are diagrams, for explaining the pickup tube shown in FIG. 14A.

An alternating signal synchronized with the horizontal scanning period of the electron beam is supplied between the aforementioned electrodes 304A and 304B as in the example of FIG. 1. Namely, a signal source 316, which produces a rectangular wave signal repeatedly turning on and off at every horizontal scanning period as shown in FIG. 3, is connected between the terminals 305A and 305B, through which the signal is applied to the electrodes 304A and 304B. The potential applied to the electrode transmitted to the photoconductive layer 311 through the thin insulating layer 302 and the signal electrode 309. As a result off this, when no light is directed to the photoconductive layer 311, there is formed on the photoconductive layer 311 a dot-like potential pattern such as depicted in FIG. 14C in which the potential is high at those areas corresponding to the electrodes 304A and low at those areas corresponding to the electrodes 304B in a certain horizontal scanning period and a dot-like potential pattern such as shown in FIG. 14D which is opposite in sense to the one described above in the subsequent horizontal scanning period. Accordingly, when no light is incident on the photoconductive layer, rectangular wave signals $S_I$ and $-S_I$ such as shown in FIG. 4A and 4A′ are respectively derived from the electrode 309 contiguous to the photoconductive layer 311 in two consecutive horizontal scanning periods as in the example of FIG. 1 and these rectangular wave signals are derived from the output terminal 310 through the capacitor 314. It will be understood that color video signals can be obtained from the resulting output by the use of circuits similar to those in FIG. 1.

Figures 15, 16:
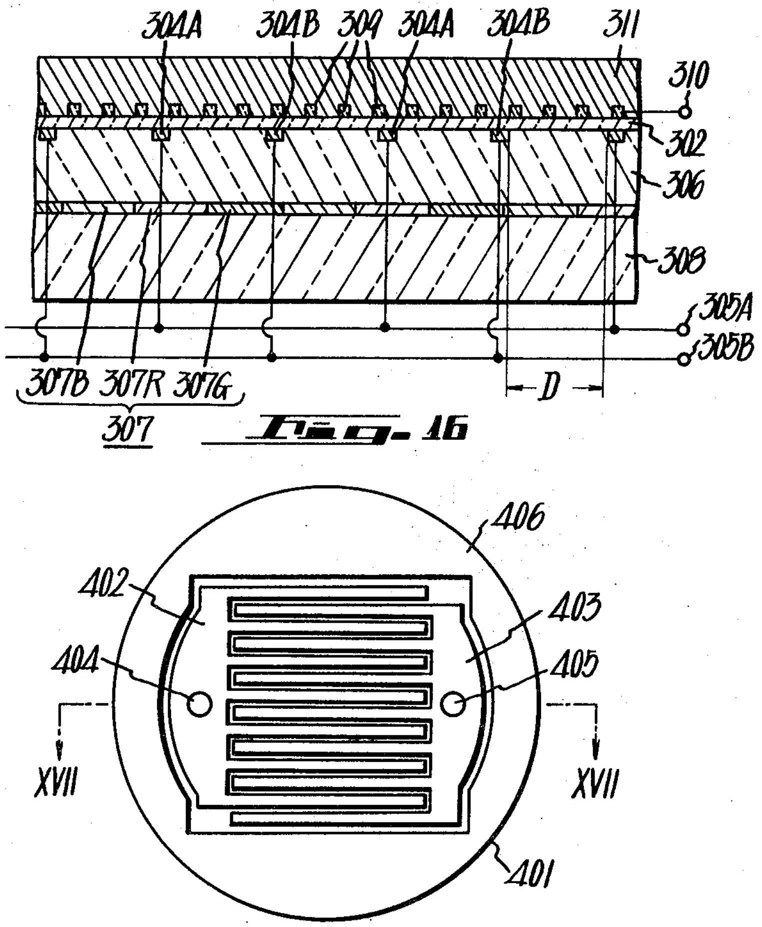
FIG. 15 is an enlarged cross-sectional view showing the principal parts of still another modification of the pickup tube.
FIG. 16 is a play view of a faceplate, for illustrating the method for supplying an alternating voltage to the pickup tube.

In FIG. 15 the electrodes 304A and 304B are formed extremely narrow, as compared with those in FIG. 14, and accordingly the distance D between adjacent electrodes 304A and 304B is large. In this case, the electrodes 304A and 304B are narrow and do not interfere with the light emanating from the object being televised to the photoconductive layer. Accordingly the construction of FIG. 15 is advantageous in that the electrodes 304A and 304B need not be transparent and may be formed of a metal such, for example, as copper, aluminum, silver or the like.

Figure 17:
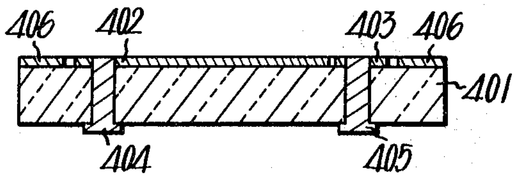
FIG. 17 is a cross-sectional view of the faceplate shown in FIG. 16.

FIGS. 16 and 17 illustrate one example of two sets of electrodes for alternating voltage supply and a means for supplying voltage to the electrodes. A faceplate 401 is deposited over the entire area with a transparent conductive layer, for example, a tin oxide layer and is then subjected to a photoetching process to remove unnecessary portions so as to form a predetermined pattern to provide two insulated comb-shaped electrodes 402 and 403 and an electrode 406 surrounding them. The two comb-shaped electrodes 402 and 403 are respectively electrically connected to conductive posts 404 and 405 made of material such as copper secured to holes bored in the faceplate 401. The electrodes 402 and 403 are supplied with alternating voltage from outside through the conductive posts 404 and 405. Since the conductive posts 404 and 405 are secured to the inside of the holes bored in the faceplate 401, no air escapes from the joints of the posts 404 and 405 and the faceplate 401. THe electrode 406 is electrically led out from the image pickup tube and is grounded or supplied with a potential equal to the electrodes 402 and 403. The electrode 406 is provided to prevent any unwanted storing charge in the faceplate resulting from impingement of an electron beam which causes a change in the locus of the electron beam within the image pickup tube and distorts the reproduced video signal. The storing of this charge can be avoided by applying to the electrode 406 a potential equal to ground potential or the potential of the electrodes 402 and 403. It is possible, of course, that storing of this charge is prevented by connecting the electrode 406 to the electrodes 402 and 403 through resistors specially provided in the image pickup tube. Further, it is also possible that a photoconductive layer is deposited all over the faceplate and the charge induced in the electrode 406 is discharged to the electrodes 402 and 403 through the resistance of the photoconductive layer.

In the present example the electrodes 402 and 403 are supplied with alternating voltage through the conductive posts 404 and 405 but it is possible to provide two photocells in the image pickup tube. The voltages produced in the photocells due to light from outside are respectively supplied to he electrodes 402 and 403.

Although the foregoing examples have been described in connection with the case where the index signal is produced by supplying an alternating voltage to two sets of electrodes, it is possible to obtain the index signal by supplying a three-phase alternating voltage to a triad of electrodes.

In the demodulator circuit of the foregoing examples the index signal derived from the subtraction circuit is reversed in phase at every horizontal scanning to be of the same phase, and the chrominance signal is demodulated by the index signal to provide color difference signals. The color difference signals however may be obtained by reversing the phase of the chrominance signal derived from the adder circuit at every horizontal scanning. In this case the phase change of the index signal is caused to agree by demodulating the chrominance signal.

Further, the foregoing examples employ a color filter consisting of three primary color filter elements but it is possible to use a color filter consisting of cyan, magenta, yellow or like complementary color filter elements. In the foregoing examples the color video signal is produced with one image pickup tube tub it is also possible that the image pickup tube is combined with another vidicon and the color video signal is combined with a luminance signal derived from the vidicon so as to produce a color video signal of high resolution.

What has been described is a color television camera which utilizes a single camera tubes and is accordingly compact, lightweight and inexpensive to manufacture; and which simultaneously derives a plurality of component color signals. This is accomplished by supplying to the photoconductive layer within the camera an indexing image and an image of the object to be televised. These images are provided in overlapping relationship. The image of the object is formed in a conventional manner by a focusing lens in combination with a color filter and a signal electrode. The indexing image if formed by supplying an electrical signal to an indexing electrode which in the preferred form of the invention is combined with the signal electrode.

The index signal is preferably supplied to the electrodes by the some levels that are used to remove the composite signal. Circuit means are sued to separate the index signal from the video signal. The index signal is then used in connection with a series of demodulators to obtain the proper relationship between the colors.

While several different embodiments of the invention have been described it is to be understood that there are merely illustrative and are in no way meant to limit the invention. For example it is possible to combine the signal and index electrodes with the photoconductive surface and to vary the physical relationship between the filter, electrodes and photoconductive surface.

It will be apparent that many modifications and variations may be effected without departing the scope of the novel concepts of this invention.

What is claimed is:

1. A color television camera for generating an electrical signal corresponding to an object in the field of view of said camera, said camera comprising a scanning surface adapted to convert light projected thereon into an electrical output, filter means disposed between said object and said scanning surface and adapted to form on said scanning surface a color separated image in accordance with the color components of said object, and circuit means for forming electrically on said scanning surface an index image having a phase that changes alternately in successive periods of said output so that said electrical output is a composite signal containing a color video signal corresponding to said color separated image and an index signal corresponding to said index image and having its phase similarly changed in said successive periods.

2. A color television camera in accordance with claim 1 wherein indexing electrodes are positioned in close proximity to said scanning surface and said circuit means are connected to said electrodes.

3. A color television camera in accordance with claim 2 wherein said composite signal containing said indexing signal and color video signal is obtained from said indexing electrodes.

4. A color television camera in accordance with claim 2 wherein scanning means are provided for scanning said scanning surface.

5. A color television camera in accordance with claim 4 wherein said circuit means comprises a signal generator for generating an alternating signal correlated to said scanning means and which is applied to said electrodes.

6. A color television camera in accordance with claim 5 wherein second circuit means are provided for deriving from said composite signal an indexing signal and a video signal.

7. A color television camera comprising a scanning surface adapted to convert light projected thereon into an electrical output, filter means disposed between said surface and an object to be reproduced for forming a color separated image of said object on said surface, first circuit means for electrically forming on said surface an index image having a phase that changes alternately in successive periods of said output so that said electrical output is a composite signal containing a color video signal corresponding to said color separated image and an index signal corresponding to said index image, and second circuit means for deriving from said composite signal an index signal and a video signal and which comprises a delay circuit for delaying said composite signal, and an adder to add said composite signal to the output of said delay circuit to obtain at the output of said adder said video signal.

8. A color television camera in accordance with claim 7 wherein said second circuit means further comprises a subtraction circuit to obtain a difference signal between said composite signal and the output from said delay circuit to obtain at the output of said subtraction circuit said index signal.

9. A color television camera in accordance with claim 8 wherein inversion means are provided for reversing the polarity of said index signal and switch means are disposed after said inversion means for alternately passing said subtraction signal and said polarity reversed index signal.

10. A color television camera in accordance with claim 9 wherein said output of said switch means and said video signal are applied to demodulator means to obtain at the output thereof signals corresponding to the color components of said object.

11. A color video signal generating apparatus comprising image pickup means having a scanning surface adapted to convert images projected thereon into an electrical output, filter means disposed between said surface and an object to be reproduced for forming on said scanning surface a color separated image in accordance with the color components of said object, index electrodes disposed in close proximity to said scanning surface, first circuit means connected with said index electrodes for electrically forming on said scanning surface an index image having a phase that changes alternately in successive periods of said electrical output so that said electrical output is a composite signal containing a color video signal corresponding to said color separated image and an index signal corresponding to said index image, a signal electrode in close proximity to said scanning surface for extracting said composite signal from the latter, and second circuit means connected with said signal electrode for separately obtaining said index signal and said color video signal from said composite signal and which comprises a delay circuit for delaying said composite signal by one of said periods of said electrical output, and an adder circuit to add said composite signal to the output of said delay circuit to obtain at the output of said adder said color video signal.

12. Apparatus in accordance with claim 11 wherein said second circuit means further comprises a subtraction circuit to obtain a difference signal between said composite signal and the output from said delay circuit to obtain at the output of said subtraction circuit said index signal.

13. Apparatus in accordance with claim 12 wherein inversion means are provided for reversing the polarity of said index signal and switch means are disposed after said inversion means for alternately passing said subtraction signal and said polarity reversed index signal.

14. Apparatus in accordance with claim 13 wherein said output of said switch means and said color video signal are applied to demodulator means to obtain at the output thereof signals corresponding to the color components of said object.

15. A color video signal generating apparatus comprising image pickup means having a photoconductive surface for the photoelectric conversion of images projected thereon into an electrical output, filter means disposed between said surface and an object to be reproduced for forming a color separated image of said object on said surface, means for forming on said surface an index image having a phase that changes alternately in successive periods of said output so that said electrical output is a composite signal containing a color video signal corresponding to said color separated image and an index signal corresponding to said index image, at least one delay circuit means for delaying said composite signal by one of said periods, adding circuit means for adding the output of said delay circuit means and said composite signal to produce said color video signal as an output from said adding circuit means, subtracting circuit means receiving said composite signal and said output of the delay circuit means to produce said index signal as the difference therebetween, and means controlled by said index signal for separating individual color component signals from said color video signal.

16. A color television camera comprising a surface scanned by an electron beam for converting light projected on said surface into an electrical output, filter means disposed between an object in the field of view of the camera and said surface for forming on said surface a color separated image of said object made up of image elements corresponding to the color components of respective elements of said object, a pair of index electrodes for each of said image elements and which are disposed in close proximity to said surface, and circuit means applying different electrical potentials to said index electrodes of each said pair thereof for electrically forming an index image on said surface and reversing said different electrical potentials in successive periods of said electrical output so that said electrical output is a composite signal containing a color video signal corresponding to said color separated image and an index signal corresponding to said index image and having its phase reversed in said successive periods.

17. A color television camera according to claim 16, in which said filter means includes groups of stripe-shaped filter elements transmitting light of respective primary colors and arranged in a repeating cyclic order, and there is a pair of said index electrodes for each of said groups of filter elements, with said index electrodes being also stripe-shaped and extending parallel to said stripe-shaped filter elements across the line-scanning direction of said electron beam.

18. A color television camera according to claim 17, in which said circuit means is synchronized with the line scanning by said electron beam to effect said reversing of said different electrical potentials in successive line scanning periods of said electron beam.

19. A color television camera according to claim 16, further comprising additional electrode means in close proximity to said surface for deriving said composite signal from the latter.

20. A color television camera according to claim 16, further comprising additional circuit means connected with said index electrodes for deriving said composite signal from the latter.

21. A color television camera according to claim 16 wherein said surface scanned by the electron beam is formed on a photoconductive layer.

22. A color television camera according to claim 16, wherein said index electrodes are transparent.

23. A color television camera according to claim 16, wherein said index electrodes abut against said surface.

24. A color television camera according to claim 16, wherein said index electrodes are disposed between said object and said surface and said filter means is disposed between said object and said index electrodes.

25. A color television camera according to claim 16, wherein said index electrodes are insulated from each other.

26. A color television camera according to claim 16, wherein a semi-insulating material interconnects said index electrodes of each said pair thereof.

* * * * *